Patented June 22, 1954

2,681,863

UNITED STATES PATENT OFFICE 2,681,863

PLASTER COMPOSITIONS AND PRODUCTS

Michele Croce and Clarence G. Shuttleworth, Evanston, Ill., assignors to Certain-Teed Products Corporation, Ardmore, Pa., a corporation of Maryland No Drawing. Application July 7, 1951, Serial No. 235,666

9 Claims. (Cl. 106—109)

This invention relates to plaster compositions and to products made from such compositions.

Where plaster compositions have been utilized in the past to produce either plastered walls, plaster wallboard, or plaster casts of various kinds, the resulting casts have in most instances been relatively hard to handle and use because of the relatively frangible character of the plaster composition after setting in the cast or finished form. Since such plaster compositions have been utilized in making plaster walls or wallboard for use in building, efforts have been made in many different ways to render such plaster casts or plaster walls or wallboard more resistant to cracking and to make these products more resistant to rough handling and more readily workable in the usual building operations and uses. For example, in wallboard and plaster walls, after they have been put in place, it is quite important that the walls be readily workable insofar as the pounding of nails and the like into such walls may be concerned.

In an effort to impart more desirable physical characteristics to plaster walls and wallboard, such as resistance to sudden, localized forces, many different ways or expedients have been employed. For example, the plaster composition utilized in the making of wallboards has in many instances been made so as to incorporate a fairly large percentage of fibrous organic material such as sawdust, sisal fibers, paper pulp and the like. Study of such prior gypsum plaster wallboard indicates that while these expedients serve to increase the nailability, certain disadvantages are encountered, and particularly it is found that the relatively high percentage of such filler or the like that must be used in such instances serves to correspondingly reduce the amount of plaster that is used, and the resulting plaster wall or wallboard possesses less strength than is desirable to resist the stresses and strains applied to such structures.

Another characteristic that is extremely desirable in plaster compositions that are used for building purposes is the workability of the resulting cast insofar as sawing or cutting may be concerned after the plaster has hardened or been put in place. For example, normal building construction in many instances requires that an opening be cut into a plaster or plasterboard wall so that an electrical outlet box may be mounted in position, and this opening must in many instances be cut into the ceiling of a room. In such instances it is found with conventional plaster compositions that there is a tendency for the plaster to break away from and at an angle to the line upon which the cut is to be made, and there is also a tendency for the plaster to break apart into fine dust, and this breaking and dusting, of course, is undesirable, particularly when the work is being done in a home or the like that is occupied.

Thus, in the use of plaster compositions such as those heretofore employed, the workability of the set plaster composition has in many instances been adversely influenced by the presence of the sisal fiber, sawdust or like fillers that have been used, and it is an important object of the present invention to enable the physical characteristics such as resistance to shock, nailability, flexibility, strength and similar characteristics of plaster casts to be enhanced in a simple and economical manner and in such a way that ready workability of the set composition is attained. Another and related object of the invention is to accomplish this in such a way that the mixing and forming operations that must be applied to the plaster composition may be readily and easily performed.

It should be observed also that in some instances asbestos has been used in plaster. In one such use the asbestos fiber has been added to plaster primarily to improve the plaster workability or trowelling characteristics while in another instance, in the Croce Patent No. 2,526,066, such asbestos fiber was added as a means for retaining an expansive component of the plaster composition in place in the set cast. In each case the amount of asbestos was quite high, and the water absorptive capacity of the asbestos has increased the drying time of casts thus made.

Another important and desirable physical attribute in plaster casts, walls, and wallboard is high resistance to cracking due to settling stresses or fire, and to enable a marked improvement to be attained in respect to this important physical characteristic of plaster casts and the like is another important object of this invention. Another and related object is to enable plaster compositions to attain such improved resistance to cracking and breaking when used in the ordinary manner to produce casts, walls, wallboard and the like.

When plaster wallboard is put in place on walls or ceilings, it is secured in place by fastening elements such as nails, clips, screws or the like, and the permanence of such fastening is dependent in a large measure upon the shearing strength of the wallboard at its line of engagement with such fastening element. This area of critical shearing strength has often constituted the point of first failure in such walls or ceilings, and it is therefore another important object to so constitute a plaster composition that plaster walls or wallboard made therefrom will exhibit a materially increased shearing strength; and a related object is to accomplish this in a simple and expeditious manner.

It has long been recognized that there are many disadvantages and objectionable features involved in the employment of asbestos fibers or organic fibers such as sisal fiber, wood fiber and paper pulp in plaster compositions and wallboard; such disadvantages including the necessity for using added mixing water, with its resulting reduction in strength and increase in drying time for the casts, coupled with the further fact that the organic fibers constitute a fire hazard in a manufacturing plant, and that such organic fibers disintegrate at relatively low temperatures. Such disadvantages are eliminated under the present invention by affording a gypsum plaster composition which utilizes drawn textile glass fibers as a bodying and strengthening component in such a way and with such efficiency as to be economically practical and in such a way that the mixing and forming, shaping and drying operations in respect to the mixed plaster or slurry may be readily and easily performed.

It is well recognized that the use of plaster or plaster wallboard as a wall surfacing in buildings serves as a protection against the destructive action of fire, and many efforts have been made to increase the fire resistant or fire retardant action of gypsum plaster walls. Such efforts have in most instances centered about the character of the lathing employed, while in another instance a heat-expansive material has been added to the plaster to compensate for heat-induced shrinkage of the plaster in the event of fire, as described in the aforesaid Croce patent. It is another important object of the present invention to enable high fire retardant characteristics to be attained in plaster compositions and products in an improved and simplified manner, and related object is to attain this result with the minimum of additives so as to thereby enable the maximum ratio of plaster to be used.

At the outset it should be noted that suggestions have heretofore been made concerning the use of glass fibers, glass wool or mineral wool in hydraulic cement mixtures or gypsum plaster mixtures for reinforcing or strengthening purposes, but such prior suggestions along this line have been found to be unworkable in a commercial sense, particularly insofar as plaster molds, casts, walls and wallboard were concerned. This impracticability of such prior suggestions has resulted from the tendency of the glass fibers or mineral wool to form agglomerate masses or balls in the mixed plaster or slurry, as contrasted with the desired dispersal of the fibers uniformly throughout the mixture. In contrast to such objectionable action of glass wool or mineral wool as suggested in the prior art, the present invention attains substantially complete and uniform dispersal of glass fibers in gypsum plaster slurry so as to thereby attain a radical improvement in the desirable physical characteristics of the resulting casts, and this is attained at a relatively low cost and in such a way as to simplify and facilitate the manufacturing and other operations involved in the mixing and forming of the slurry.

Glass fibers may be classified generally in two main categories or groups as blown glass fibers or as drawn textile glass fibers, and while these classifications are based upon the method of production of the fibers, there also are many definite and important distinctions between such groups as to physical characteristics and properties of the fibers as well as in the relationship of the individual fibers to each other. Thus, blown glass fibers are formed by steam blowing of a molten glass stream to attenuate the stream into small diameter fibers, and such fibers take a form known generally as glass wool or mineral wool in that the fibers are not straight and are interlaced in a random relation with each other. The fiber length may vary considerably in such glass wool, and separation of individual fibers from the mass is quite difficult because of the curled and interlaced or matter relationship of the fibers in the mass. Such separation of individual fibers from the mass is also rendered difficult by reason of the relatively low physical strength characteristics of the blown fibers which bend quite easily and tend either to retain their bent form or to break at the bend.

The drawn textile glass fibers are on the other hand, produced as continuous filaments, each of which is discharged in a molten state through an orifice and is attenuated by winding on a high speed winding drum. In the production, winding and handling of drawn glass fibers or filaments it is essential that a great many such extremely fine filaments be grouped into strands each containing from one hundred to several hundred individual filaments so that the forces that are necessarily involved in the high speed handling will not cause breakage of the filaments. Because of such grouping, the abrasive character of the glass makes it necessary as a practical matter to apply a protective coating to such filaments to prevent abrading action between the several grouped filaments of each strand and between the strands that form the roving. Such protective coating material is usually termed the "bonding" material although the actual bonding action in the case of some of the commonly used coating materials such as a starch coating is relatively slight, so that the fibers or filaments may in such instances be said to be loosely bonded or loosely associated. In other instances, the coating material may be of such a character as to hold the filaments of the strand quite permanently together and some thermoplastic resins when used as the bonding material act to produce such a strong bond in the strand.

Under the present invention, resort is had to the use of the more costly drawn textile glass fibers that are loosely bonded or loosely associated and by attaining complete dispersion of such fibers in the mixture in the manner described hereinafter, the full strengthening and bodying effect of each of the individual fibers is realized with the net effect that the quantity or proportion of the drawn glass fibers is minimized and the use of the costly fiber is rendered practical in an economic sense.

The drawn glass fiber component of the plaster composition is afforded by a small percentage of drawn textile glass fibers cut into short lengths and incorporated in the gypsum plaster, and such glass fibers are of such a character that they will separate and attain an almost complete or individual dispersion of the individual filaments as a slurry is formed from the plaster composition. Such drawn glass fibers, of course, may be of different diameters but are in any event extremely small or fine. Thus, a fiber having a diameter of about 0.00024 inch which is commercially available, has been found to be highly effective as will be described in detail hereinafter.

The glass fiber material utilized under the present invention is one that is loosely bonded or associated as by a bonding material that is water softenable or water soluble in character, and the strands are cut into short lengths, within in the range of ⅛ inch to one inch so as to afford short sections or bundles of fibers, each bundle being formed by a cut length of a strand, and it has been found that a length of about one-half inch is very satisfactory. Under the present invention the binder is afforded by a water softenable or a water soluble material such as a starch material or water softenable resins, and it is found that with such a binder the individual filaments which make up each bundle or short section of strand tend to remain together in their bundle in the course of a short dry-mixing operation with the other components of the plaster composition, although there is a substantial separation of the filaments from their bundles as such dry-mixing progresses.

In this short bundle-like form, the strength and resilience of the bundles and of the fibers is sufficiently high to prevent breaking of the strand or the individual fibers or filaments by the forces that may be applied thereto in a mixing operation. Moreover, the strength and springiness of the individual fibers and the bundles as compared to the forces that may be applied thereto in a dry or wet mixing operation with the plaster is sufficient to prevent the formation of swirls, balls or agglomerate masses. Hence, in mixing operation that is applied to a composition which includes relatively short bundles of loosely bonded drawn glass fibers as aforesaid is effective primarily to produce uniformity of distribution of the bundles and individual fibers throughout the mass of material. As hereinabove pointed out, the dry mixing operation does in fact cause separation of individual fibers or small groups of fibers from the bundles, but such action is relatively slow so long as the water soluble or water softenable binder is not subjected to the action of water. Such dry mixing may, of course, be carried on until the fibers have been completely separated from their bundles and completely dispersed in the dry mix, but this is usually considered unnecessary in view of the ease of dispersion in the final wet mix. The preliminary distribution of the bundles and individual glass fibers in a short dry mixing operation serves, however, to simplify small batch usage of the mixture, as well as to simplify the wet mixing operation and when the water is fed into the plaster composition in the wet mixer, the action of the water immediately dissolves or softens the binder to such an extent that a relatively short wet mixing operation performed in a continuous mixer causes practically complete separation of the individual drawn glass fibers from their bundle form so that such individual glass fibers are almost completely dispersed in a uniform manner throughout the body of the slurry. Then in the molding or casting operation the individual glass filaments are uniformly located throughout the mass with what might be termed a random dispersion as to relative direction within the cast, and it is by reason of this thorough dispersion and the random relationship of the direction of the individual fibers that the present invention attains the desired improvement in the physical characteristics of the resulting casts, as will be described in some detail hereinafter.

The percentage by weight of loosely bonded drawn glass fiber used under the present invention is from 0.03% to 10% with the balance of the composition being afforded by calcined gypsum plaster, and the length of the fibers may be varied between about ⅛ inch and one inch, and it is to be understood of course, that the present invention contemplates the use of small added quantities of retarders, accelerators, starches or core adhesives and the like in accordance with usual practice, as well as the addition of weight reducing foam and core adhesive when the present invention is employed in the manufacture of gypsum wallboard or like products.

For purposes of comparison with conventional gypsum wallboard, wallboard was made in half inch thickness in a board plant with the usual equipment to afford four different kinds of board in substantial quantities, the first of which was a conventional paper surfaced board, identified hereinafter as board A, including 2½% of sawdust as well as the usual amount of core adhesive, and the usual amount of weight-reducing foam. The usual amount of core adhesive is about 1% or less of the combined weight of the dry constituents, and in the present instance ¾ of one percent of gelatinized starch was used, based on the combined weight of the dry plaster and sawdust.

Boards B, C and D were prepared with the same paper, and the same core adhesive and foam content, but the sawdust component was eliminated, and board B contained 0.05% of drawn textile glass fiber in ½ inch lengths and dispersed in the mixture as above described; board C contained 0.1% of such fiber; while board D contained 0.25% of such textile glass fiber. By reason of the reduction in fiber content that was effected in boards B, C and D, there was of course a corresponding increase in the amount of gypsum plaster employed.

With the exception of the elimination of the sawdust component and the use of small quantities of drawn textile glass fibers in boards, B, C, and D, these boards were in all respects the same as the regular board A which was made to serve as a standard of comparison.

After the aforesaid boards had been made, these boards were subjected to a series of somewhat empirical tests designed to afford a more or less numerical basis for comparing the various desirable physical qualities or characteristics of such boards. The results of these tests are included in the following table, and the precise nature of the tests will be described following such table:

Table I

|  | Board B, 0.05% fiber | Board C, 0.1% fiber | Board D, 0.25% fiber | Board A, Regular board |
|---|---|---|---|---|
| Whipping Test: Number of whips to break. | 11 | 10 | 15 | 7. |
| Shock Test: Drop of Weight | 9 inches | 10 inches | 13 inches | 9 inches. |
| Small Furnace Test: With 4½ lb. load midway between joists. | 45 minutes plus ¹ | 45 min. plus | 45 min. plus | 16½ minutes. |
| Nailing Test | poor | satisfactory | good | good. |
| Breaking when scored | do | fairly good | do | Do. |
| Resistance to Crushing by Hammer blow. | fair | do | do | Do. |

¹ Board B with 0.05% fiber cracked rather badly in the above test.

The whipping test is one that is quite important from a practical standpoint in that it simulates a condition that is often encountered in the handling or installation of plaster wallboard. Thus in this test the opposite ends of 4 foot by 8 foot sheet of plaster board are grasped by two men and the board is moved up and down so as to cause the central portion of the board to bow downwardly and then upwardly with what might be termed a whipping action. In such handling, any weakness in the board is liable to cause breakage, and by counting the number of whips or up and down movements necessary to break such a board, a numerical index is afforded which is representative of the strength characteristics of the board.

The shock test was made by supporting a piece of board one foot wide and four feet long on three feet centers, and in this instance the grain of the paper extended transversely of the width of the sample. A loading board was then placed in the center of the span and a sling arrangement was attached to the loading board. A weight of 660 grams was then attached to the sling by means of a rope. This weight was raised up one inch and then dropped and this dropping action was repeated through progressively larger distances, the increase between drops being one inch in each instance, and this was continued until failure or breakage of the test board. The results of this test were indicated by the number of inches of the final dropping movement of such weight.

In the furnace test the board samples were nailed on 6-inch centers to the lower faces of joists spaced on 16-inch centers and a 4½ lb. load was placed on the board midway between the joists. The board as thus supported formed what may be termed the upper wall of the furnace and the temperature developed in the furnace was substantially 1200 to 1300 degrees F. at the end of 15 minutes and was thereafter maintained at 1300 to 1500 degrees F.

The nailing test is performed by driving 5 penny cement coated wallboard nails into a wallboard near an open or cut edge, and observing whether and to what extent the plaster core splits out or breaks. The first such nail was driven at a point ⅜ inch in from the cut edge of the board, and successive nails were driven at points located progressively close to such edge.

The break test was performed by cutting one paper cover of the board along a straight line entirely across the sample, and then breaking to determine whether the board would break along a straight line as is desired in use of such board.

The test relating to resistance to hammer blows was performed by striking the boards near an open or cut edge and at different distances from the edge, and the quality of the board in this respect is judged by the extent to which the core shatters or flies out of such edge in response to the blows.

The tests included in Table I show that as compared with conventional plaster wallboard as represented by board A, boards B, C and D attain a marked improvement in respect to fire resistance, while boards C and D attain satisfactory characteristics in the other tests.

In a fire test conducted on board D, hereinabove described, at the Underwriters Laboratories, Chicago, Illinois, such board was installed as the covering on a load-bearing partition and tested according to the Standard Methods of Fire Tests of Building Construction and Materials, A. S. T. M. Designation E119–50. In such test board D attained a fire resistance rating of 51 minutes, 25 seconds, which far exceeds any rating given any half-inch, paper covered plasterboard heretofore tested in such a load-bearing partition fire test. One highly significant feature of such test was that in contrast with the cracking and falling of the plasterboard which was always experienced in prior load-bearing partition tests of ordinary one-half inch plaster wallboards, board D remained intact and in place on the wall or partition at the end of such 51-minute, 25-second period, and the failure which determined the extent the rating granted was based on weakening and bowing of the studs due to charring.

It is recognized, of course, that in plaster wallboard, particularly in relatively thin wallboards, the strength characteristics are influenced in a large measure by the strength of the paper liners and in order to afford a basis for determining the action of the drawn textile glass fibers in the absence of such paper liners or the like, slabs were made in half-inch thickness and without paper liners. In the following table, slabs of this kind are shown which were made without fiber content of any kind and with 2% of fine fibrous sawdust as a fiber, in addition to several different samples including different percentages of drawn textile glass fibers cut in half-inch lengths as hereinbefore described. These samples of course did not include weight-reducing foam, nor did they include core adhesive, but were made solely with gypsum plaster, or with plaster and sawdust or drawn textile glass fibers as indicated in the following table which shows the transverse strength of the respective samples.

Results of these tests:

*Table II*

|  | Weight per sq. ft. | Caliper | Transverse Strength Per Foot of Width |
| --- | --- | --- | --- |
|  | *Lbs.* | *Inch* | *Lbs.* |
| No Fiber | 2.12 | 0.528 | 50.1 |
| 2% Fine Fibrous Sawdust | 2.04 | 0.530 | 46.1 |
| 0.1% Fiber Glass | 2.04 | 0.530 | 50.1 |
| ¼% Fiber Glass | 2.04 | 0.530 | 54.5 |
| ½% Fiber Glass | 2.04 | 0.515 | 58.5 |
| 1.0% Fiber Glass | 2.11 | 0.515 | 69.0 |

The tests relating to the transverse strength of the board were in the nature of beam tests in which a sample of about 16 inches in length and 12 inches in width was placed across two knife-edge supports disposed 14 inches apart, and a load was applied gradually by a knife-edge member to the upper face of the sample midway between the two load supports.

In the foregoing examples and tests it was observed that the presence of core adhesive such as gelatinized starch in the commercially produced-wallboard samples B, C, and D had the effect of increasing the bond of the set gypsum with the drawn glass fibers.

In all of the examples of the invention it was observed that at least one desirable characteristic in the cast was enhanced by the presence or use of drawn textile glass fibers, and this was particularly true in respect to resistance to the heat of a fire.

The advantageous characteristics have been described herein as observed in plasterboard or in thin casts or panels, but it will be evident that these improved characteristics are applicable to plaster molding and molded plaster products generally.

From the foregoing it will be apparent that the present invention enables gypsum plaster to be bodied and strengthened in a practical and economical manner through the use of drawn textile glass fibers so that the physical characteristics of the resulting casts are improved in many different ways and to a great and unexpected extent. In the ensuing claims, terms such as "strands," "strand sections," or "bundles," refer to the basic glass textile units which are formed in the manufacture of glass textiles, each such unit comprising a multiplicity of individual glass textile filaments; and the individual filament components of said basic glass textile units are denoted by the term "filaments."

We claim:

1. In a method of producing gypsum plaster casts, the steps comprising introducing short sections of textile glass strands into a gypsum plaster, each strand section comprising a plurality of substantially straight, resilient, textile glass filaments, said filaments being sufficiently weakly bonded into said strand section to be capable of ready separation therefrom during agitation with said plaster, and agitating said sections and said plaster to reduce said strand sections to their individual filaments, said agitation continuing until said individual filaments are individually and uniformly distributed throughout said gypsum plaster.

2. The method recited in claim 1, wherein said individual glass filaments comprise not substantially more than 1.0% and not substantially less than 0.03% by weight of the total weight of the gypsum plaster and individual glass filaments.

3. In a method of producing gypsum plaster casts, the steps comprising cutting into short bundles glass textile strands, each bundle consisting of a plurality of individual, substantially straight, resilient glass textile filaments bonded together by a water-softenable binder with a sufficiently weak bond to enable separation of said filaments from said bundles during agitation for mixing said bundles with a plaster and water, introducing said bundles into gypsum plaster, and agitating said bundles in said plaster in the presence of water to disperse individual filaments from said bundles throughout said plaster.

4. The method recited in claim 3, wherein the individual glass filaments comprise substantially less than 1% and not substantially less than .03% of the total weight of the gypsum plaster and individual glass filaments.

5. In a plaster board, a body member having paper covers on opposite faces thereof, said body member comprising set gypsum plaster as the major ingredient, and also containing a reinforcing ingredient consisting essentially of short, substantially straight, resilient, flexible, individual textile glass filaments, said individual textile glass filaments being individually and uniformly distributed throughout said body member.

6. The combination recited in claim 5 wherein said individual filaments comprise not substantially less than .03% and not substantially more than ½% by weight of the total weight of the gypsum plaster and filament components.

7. A composition convertible by water addition and mixing to a moldable and settable plastic mass, said composition comprising calcined gypsum plaster as the major ingredient and short sections of glass textile strands each composed of substantially straight, resilient, flexible, individual textile glass filaments, bound into said strand sections by a water softenable binder, said filaments lying closely together in substantially parallel relationship in said sections, and the bonding of said filaments being sufficiently weak to enable separation of said filaments from said sections and dispersal thereof individually throughout said plaster as an incident to agitation for mixing said sections and plaster in the presence of water.

8. A composition as recited in claim 7, wherein said sections of textile glass filaments comprise from .03% to 1% by weight of the total weight of the gypsum plaster and glass filaments.

9. A cast resistant to fire and mechanical shock comprising set gypsum plaster as the major ingredient, and also containing a reinforcing ingredient consisting essentially of short, substantially straight, resilient, flexible, individual textile glass filaments, said individual textile glass filaments being distributed individually and uniformly throughout said cast.

References Cited in the file of this patent

UNITED STATES PATENTS

| Number | Name | Date |
|---|---|---|
| 406,585 | King | July 9, 1889 |
| 2,198,776 | King et al. | Apr. 30, 1940 |
| 2,352,201 | Jacob | June 27, 1944 |
| 2,425,883 | Jackson | Aug. 19, 1947 |
| 2,526,066 | Croce | Oct. 17, 1950 |

FOREIGN PATENTS

| Number | Country | Date |
|---|---|---|
| 49,883 | Netherlands | Feb. 15, 1941 |
| 587,556 | Great Britain | Apr. 29, 1947 |

OTHER REFERENCES

Ceramic Industry, 56, No. 5, page 40 (1951).